United States Patent
Okada et al.

(10) Patent No.: US 12,292,976 B2
(45) Date of Patent: May 6, 2025

(54) RISK EVALUATION APPARATUS, RISK EVALUATION METHOD, AND NON-TRANSITORY COMPUTER-READABLE RECORDING MEDIUM

(71) Applicant: NIPPON TELEGRAPH AND TELEPHONE CORPORATION, Tokyo (JP)

(72) Inventors: Rina Okada, Musashino (JP); Satoshi Hasegawa, Musashino (JP)

(73) Assignee: NIPPON TELEGRAPH AND TELEPHONE CORPORATION, Tokyo (JP)

(*) Notice: Subject to any disclaimer, the term of this patent is extended or adjusted under 35 U.S.C. 154(b) by 364 days.

(21) Appl. No.: 17/782,195

(22) PCT Filed: Jan. 14, 2020

(86) PCT No.: PCT/JP2020/000862
§ 371 (c)(1),
(2) Date: Jun. 3, 2022

(87) PCT Pub. No.: WO2021/144841
PCT Pub. Date: Jul. 22, 2021

(65) Prior Publication Data
US 2023/0004647 A1    Jan. 5, 2023

(51) Int. Cl.
G06F 21/57    (2013.01)
G06N 20/00    (2019.01)

(52) U.S. Cl.
CPC ............ G06F 21/57 (2013.01); G06N 20/00 (2019.01)

(58) Field of Classification Search
CPC .................................. G06F 21/57; G06N 20/00
See application file for complete search history.

(56) References Cited

U.S. PATENT DOCUMENTS 11,755,743 B2 * 9/2023 Sharma .................. G06F 21/55
726/25
2016/0321382 A1 * 11/2016 Jou ........................ G06F 30/23
(Continued)

FOREIGN PATENT DOCUMENTS

EP    3745326 A1 * 12/2020 ............. G06N 20/20

OTHER PUBLICATIONS

Juuti et al., "PRADA: Protecting Against DNN Model Stealing Attacks", In 2019 IEEE European Symposium on Security and Privacy (EuroS&P), arXiv:1805.02628v5 [cs.CR], 2019, pp. 512-527.

(Continued)

*Primary Examiner* — John B King
*Assistant Examiner* — Alex D Carrasquillo
(74) *Attorney, Agent, or Firm* — XSENSUS LLP (57) ABSTRACT

The risk evaluation apparatus evaluates the risk of a machine learning model. The risk evaluation apparatus includes a recording unit, a loss function regression model acquirer, an attack noise addition unit, an error acquisition unit, and an evaluation unit. The recording unit records a set of predetermined loss functions and a set of pairs of data and labels predetermined. The loss function regression model acquirer determines a regression model of the loss function in the vicinity of data by nonparametric regression. The attack noise addition unit creates attack data that is an Adversarial Example using the regression model. The error acquisition unit determines the error between the output of the machine learning model when the data is input and the output of the machine learning model when the attack data is input. The evaluation unit evaluates the risk based on a set of errors.

11 Claims, 4 Drawing Sheets

(56) References Cited

U.S. PATENT DOCUMENTS

2017/0132512 A1* 5/2017 Ioffe ................... G06V 10/774
2021/0157912 A1* 5/2021 Kruthiveti
　　　　　　　　　　　　Subrahmanyeswara Sai ..............
　　　　　　　　　　　　　　　　　　　　　　　　G06F 21/554
2021/0241119 A1* 8/2021 Takahashi .............. G06N 3/045

OTHER PUBLICATIONS

Tramer et al., "Stealing Machine Learning Models via Prediction APIs", In 25th USENIX Security Symposium (USENIX Security 16), Aug. 10-12, 2016, pp. 601-618.

* cited by examiner

RISK EVALUATION APPARATUS, RISK EVALUATION METHOD, AND NON-TRANSITORY COMPUTER-READABLE RECORDING MEDIUM

CROSS-REFERENCE TO RELATED APPLICATION

The present application is based on PCT filing PCT/JP2020/000862, filed Jan. 14, 2020, the entire contents of which are incorporated herein by reference.

TECHNICAL FIELD

The present invention relates to a risk evaluation apparatus, a risk evaluation method, and a risk evaluation program for evaluating the risk of a machine learning model.

BACKGROUND ART

There are machine learning services that construct a machine learning model and allow users to utilize the machine learning model. In such a service, data that the user wants to predict or classify is input into the machine learning model, and the output from the machine learning model is used as a prediction result or a classification result.

"Adversarial Example" is data in which a small amount of noise is added to the data to be predicted or classified in order to respond with a result different from the original prediction result or the classification result. For example, consider recognizing the color of a traffic light in a machine learning model during automatic driving of an automobile. When the image of the traffic light is input into the machine learning model, if an attacker adds noise on the image of the traffic light, and the image of the traffic light is changed to the Adversarial Example, there is a risk of the image that should be recognized as "red" being recognized as "blue" or "yellow". This is a critical attack that leads to a traffic accident.

As a method for creating an Adversarial Example, a method called "Fast Gradient Sign Method (FGSM)" is known. NPLs 1 and 2 describe techniques for creating Adversarial Examples in combination with an attack called "model extraction".

CITATION LIST

Non Patent Literature

NPL 1: Mika Juuti, Sebastian Szyller, Samuel Marchal, and N Asokan. Prada: protecting against dnn model stealing attacks. In 2019 IEEE European Symposium on Security and Privacy (EuroS&P), pp. 512-527. IEEE, 2019.

NPL 2: Florian Tramèr, Fan Zhang, Ari Juels, Michael K Reiter, and Thomas Ristenpart., Stealing machine learning models via prediction apis. In 25th USENIX Security Symposium (USENIX Security 16), pp. 601-618, 2016.

SUMMARY OF THE INVENTION

Technical Problem

The elements constituting a machine learning model include a model structure, activation function, loss function, and hyperparameters. A model extraction attack is a technique for estimating a machine learning model from an input/output relationship of the machine learning model. However, the model extraction attack assumes a slightly looser situation in which an attacker knows some of the elements constituting the machine learning model. However, most of machine learning services are provided to users with the detailed mechanism of a machine learning model that is not easily known. Thus, an object of the present invention is to create an Adversarial Example without combining a model extraction attack to evaluate a risk.

Means for Solving the Problem

A risk evaluation apparatus of the present invention evaluates a risk of a machine learning model. The risk evaluation apparatus includes a recording unit, a loss function regression model acquirer, an attack noise addition unit, an error acquisition unit, and an evaluation unit. The recording unit records a set of predetermined loss functions and a set of pairs of predetermined data and labels. The loss function regression model acquirer determines, for each loss function and for each pair of data and labels, a regression model of the loss function in the vicinity of the data by nonparametric regression. The attack noise addition unit creates, using a regression model, attack data for each loss function and for each pair of data and labels. The error acquisition unit determines an error between an output of the machine learning model in a case where the data is input and an output of the machine learning model in a case where the attack data is input, for each loss function and for each pair of data and labels. The evaluation unit evaluates the risk based on a set of errors determined for each loss function and for each pair of data and labels.

Effects of the Invention

The risk evaluation apparatus according to the present invention determines a regression model of a loss function while placing limitation to the vicinity of the data and creates an Adversarial Example using the determined regression model. Thus, it is possible to create an Adversarial Example and evaluate a risk without performing a model extraction attack

DESCRIPTION OF EMBODIMENTS

Hereinafter, embodiments of the present invention will be described in detail. Note that components having the same

First Embodiment

In the Fast Gradient Sign Method (FGSM), Adversarial Example d' is determined as follows.

$$d'=d+\varepsilon \cdot \text{sign}(\nabla_d L(M(d),s))$$

Where, L indicates a loss function, d indicates data input into a machine learning model, M(d) indicates an output when the data d is input into the machine learning model, s indicates a correct output (label) for the data d, c indicates the magnitude of predetermined noise, sign indicates a function for acquiring the direction of a vector, and $\nabla_d$ indicates a partial derivative at a variable d.

An attacker needs to know the loss function when using the FGSM described above. Thus, a set of possible loss functions L and data sets D including pairs of data d and labels s, are prepared in advance. Then, by estimating the loss function in the vicinity of the data d by nonparametric regression, risk evaluation is performed efficiently.

Figure 1:
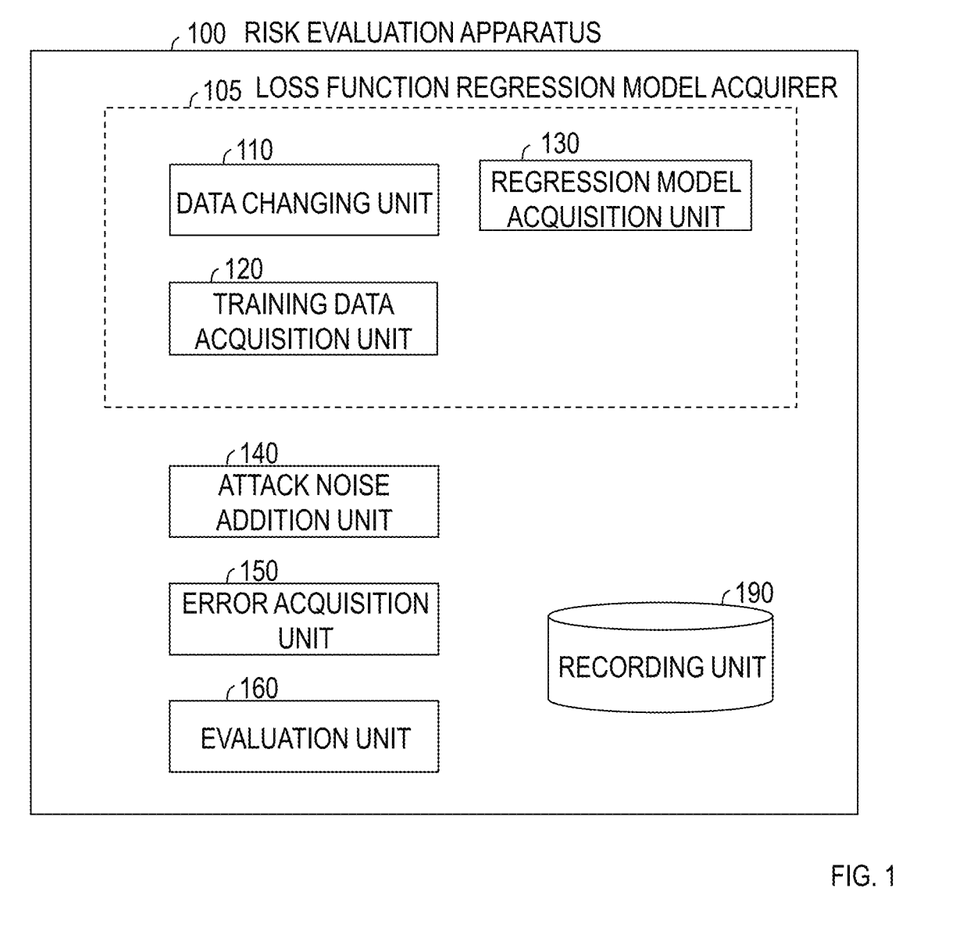
FIG. 1 is a diagram illustrating a functional configuration example of a risk evaluation apparatus 100 according to the present invention.
Figure 2:
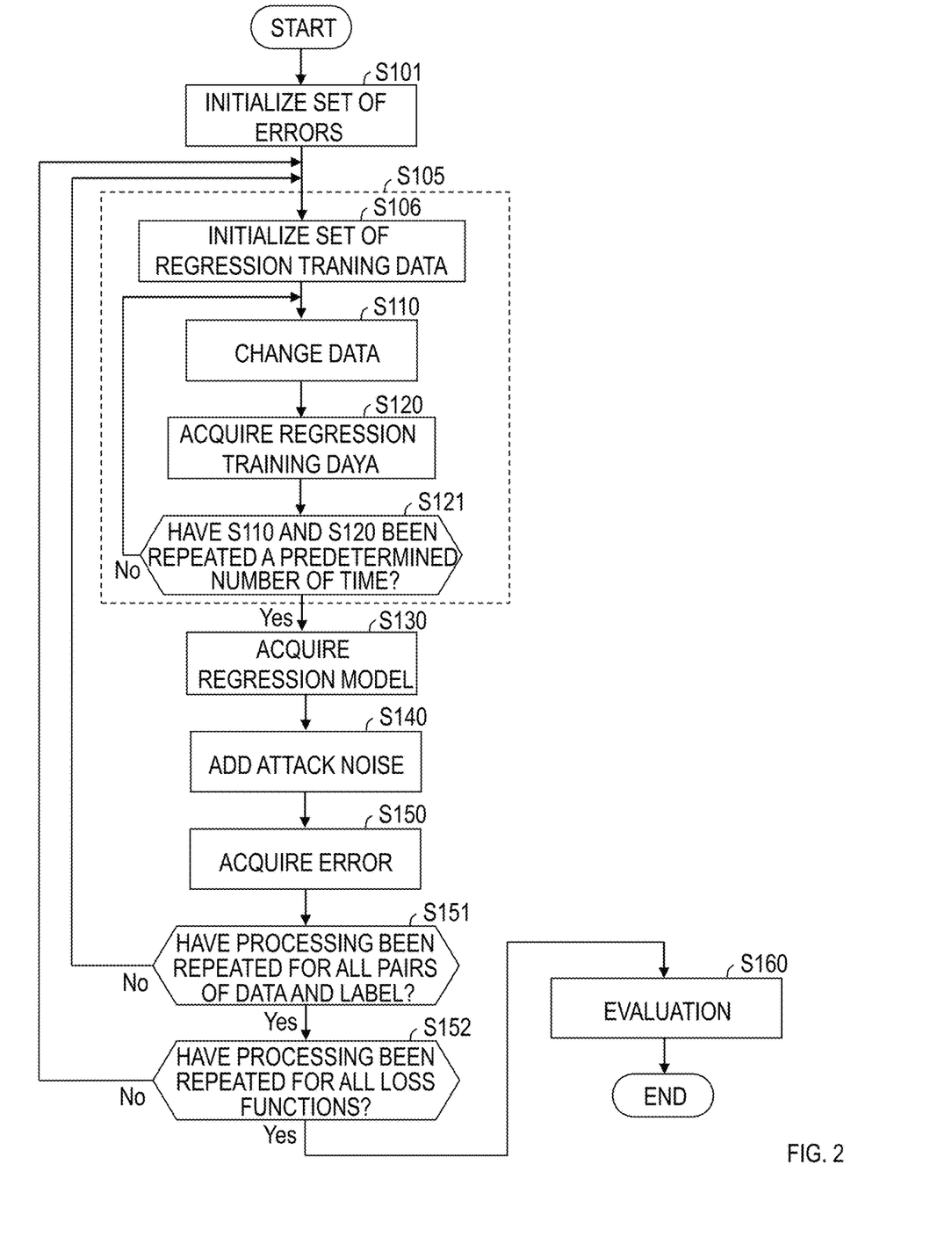
FIG. 2 is a diagram illustrating an example of a processing flowchart of the risk evaluation apparatus according to the present invention.

FIG. 1 illustrates a functional configuration example of a risk evaluation apparatus 100 according to the present invention, and FIG. 2 illustrates an example of the processing flowchart of the risk evaluation apparatus according to the present invention. The risk evaluation apparatus 100 evaluates the risk of a machine learning model. The risk evaluation apparatus 100 includes a recording unit 190, a loss function regression model acquirer 105, an attack noise addition unit 140, an error acquisition unit 150, and an evaluation unit 160.

The recording unit 190 records a set of predetermined loss functions L and the data sets D including pairs (d, s) of the predetermined data d and labels s. The data d is present in a space that can be input into the machine learning model. For example, in a case where the data d is present in real coordinate space R, d∈R holds. Further, in the m-dimensional real coordinate space, d∈ $R^m$ holds. The label s is a correct output corresponding to the data d, and is present in the space where the machine learning model can output. The label s may be present in the real coordinate space or may be present in the discrete space. For example, when the prediction result is output as a real numerical value, the label s is in the real coordinate space, and when the classification result is indicated by a discrete numerical value, the label s is in the discrete space. In a case where the label s is present in the real coordinate space, a squared loss, a γ-quantile loss, a Huber loss, a ε-insensitive loss, and the like are recorded as a loss function L in the recording unit 190. In the case where the label s is present in the discrete space, and in the case of a binary classification, a 0-1 loss function, a logistic loss, an exponential loss, a flattening hinge loss, and the like are recorded as the loss function L in the recording unit 190. In a case where the label s is present in the discrete space, and in the case of the multiclass classification, the cross entropy and the like are recorded as the loss function L in the recording unit 190.

Note that assuming an actual attacker for the machine learning model, the attacker does not know the data set utilized for training, so that the data sets for attack may include a data set utilized for training the machine learning model to be evaluated. Thus, a data set utilized for training the machine learning model to be evaluated may be included in the data sets D. However, when a risk evaluation of a machine learning model trained by itself is performed, data sets other than the data sets utilized for training the machine learning model to be evaluated is prepared as the data sets D. For example, a part of the data sets prepared for training the machine learning model is used as the data sets D for risk evaluation without being used for training.

First, the risk evaluation apparatus 100 initializes a set of errors E (S101). The loss function regression model acquirer 105 determines a regression model G of the loss function L in the vicinity of the data d by "nonparametric regression" for each predetermined loss function L and for each pair of data and labels (d, s) (S105). "Nonparametric regression" includes smoothing splines, Gaussian process regression, kernel regression, and the like. These regression methods are used as appropriate. In particular, Gaussian process regression is easily used. More specifically, the loss function regression model acquirer 105 includes a data changing unit 110, a training data acquisition unit 120, and a regression model acquisition unit 130.

The loss function regression model acquirer 105 initializes a set of regression training data $D_{train}$ (S106). The data changing unit 110 randomly changes the data d in the vicinity of the data d in accordance with a predetermined distribution within the space that can be input into the machine learning model, to determine random change data r' (S110). For example, a random number r generated in accordance with the predetermined distribution is added to the data d, and adjustment is performed such that the addition result (r+d) is within the space that can be input into the machine learning model. For example, the normal distribution may be used as the predetermined distribution to determine the random change data r' as follows.

$$r=N(O,\sigma^2)$$

$$r'=\text{adjust}(d+r)$$

Alternatively, the random change data r' may be determined as follows.

$$r'=\text{adjust}(N(d,\sigma^2))$$

Where, N(a, $\sigma^2$) is a function to randomly select a random number from the normal distribution with a mean value a and a variance $\sigma^2$ in the space that can be input into the machine learning model. b=adjust(a) indicates a function to format the variable a such that b is in the space that can be input into the machine learning model. For example, in a case where a is out of the space, a method may be used in which the part out of the space is replaced with the minimum value or the maximum value. Note that, if the variance $\sigma^2$ of the normal distribution is appropriately selected, it is easy to acquire the regression training data necessary to acquire the regression model in the vicinity of the data d.

The training data acquisition unit 120 determines the regression training data (r', L(M(r'), s)) which is a pair of the random change data r' and a loss value L(M(r'), s) obtained from the loss function in a case where the output M(r') of the machine learning model when the random change data is input and the label s are input (S120). Then, the regression training data (r', L(M(r'), s)) is added to the set of the regression training data $D_{train}$. Specifically, the regression training data (r', L(M(r'), s)) is added to the set of the regression training data $D_{train}$ in as follows.

$$D_{train}=D_{train}\cup(r',L(M(r'),s))$$

The loss function regression model acquirer 105 repeats a data change step S110 and a training data acquisition step S120 for a predetermined number of times (S121). The number of repetitions is determined as appropriate. If the number of repetitions is approximately ten to twenty, the regression model of the loss function can be easily determined in the vicinity of the data d, and efficient risk evaluation can be easily performed.

The regression model acquisition unit 130 uses the set of regression training data to determine the regression model of the loss function in the vicinity of the data d (S130). Specifically, the regression model G is determined by using the set of the regression training data $D_{train}$ as follows.

$$G=REG_{train}(D_{train})$$

Where, $REG_{train}(D_{train})$ is a function to receive the set $D_{train}$ as training data and output the regression model.

Figure 3A:
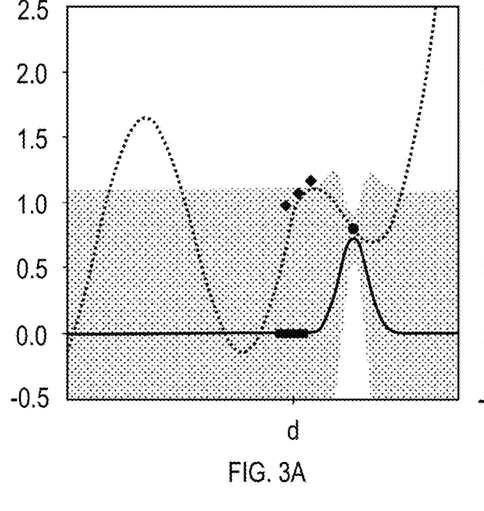
FIG. 3A illustrates a Gaussian process regression model in a case where the number of regression training data is one.
Figure 3B:
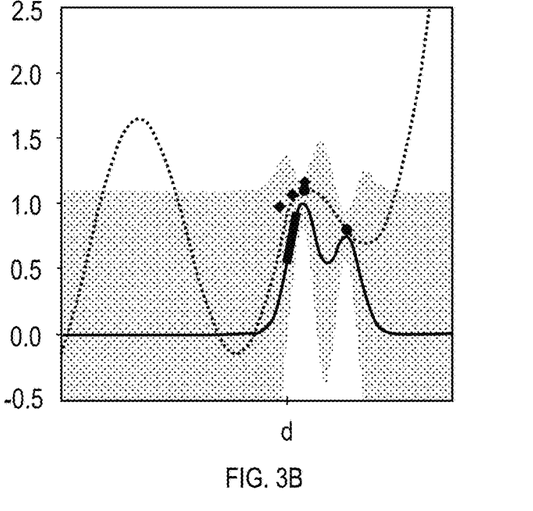
FIG. 3B illustrates a Gaussian process regression model in a case where the number of regression training data is two.
Figure 3C:
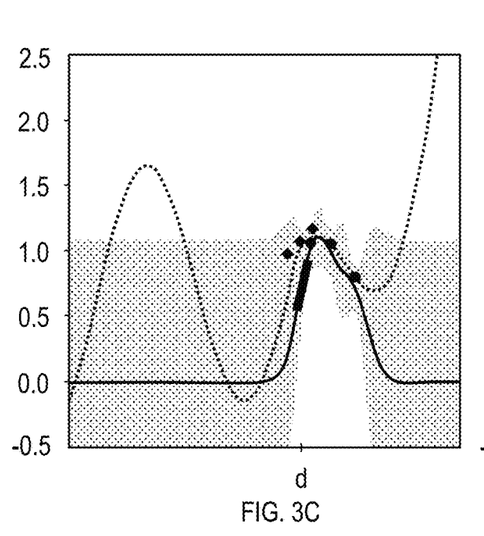
FIG. 3C illustrates a Gaussian process regression model in a case where the number of regression training data is three.
Figure 3D:
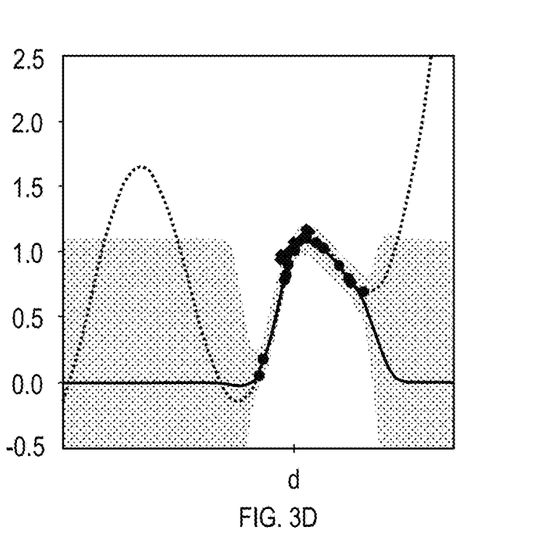
FIG. 3D illustrates a Gaussian process regression model in a case where the number of regression training data is thirteen.

FIGS. 3A to 3D illustrates the relationship between the number of repetitions (that is, the number of regression training data) and the Gaussian process regression model. FIG. 3A illustrates a Gaussian process regression model in a case where the number of regression training data is one. FIG. 3B illustrates a Gaussian process regression model in a case where the number of regression training data is two. FIG. 3C illustrates a Gaussian process regression model in a case where the number of regression training data is three. FIG. 3D illustrates a Gaussian process regression model in a case where the number of regression training data is thirteen. The horizontal axis indicates the space that can be input into the machine learning model. The vertical axis indicates the loss value of the loss function. "d" in the horizontal axis indicates an example of d of a pair of predetermined data and labels (d, s). The thin dotted line indicates the loss function of the machine learning model for risk evaluation. The thick dotted line indicates the slope of the loss function at the data d. The thin solid line indicates a Gaussian process regression model of the loss function. The thick solid line indicates the slope of the Gaussian process regression model at the data d. The dots indicate the regression training data. It can be seen that the slope of the loss function of the machine learning model for the risk evaluation and the slope of the Gaussian process regression model are nearly the same when the number of regression training data is thirteen. In addition, it can also be seen that the regression model of the loss function in the vicinity of the data d can be determined by the loss function regression model acquisition step S105.

The attack noise addition unit 140 creates, using the regression model G, attack data that is an Adversarial Example for each predetermined loss function L and for each pair of data and labels (d, s) (S140). Specifically, attack data d' is determined as follows.

$$d'=d+\varepsilon \cdot sign(\nabla_d G(M(d),s))$$

$\varepsilon$ indicates the magnitude of predetermined noise. sign indicates a function to acquire the direction of a vector. $\nabla_d$ indicates a partial derivative at the variable d and is a function to determine the slope of the regression model G.

The error acquisition unit 150 determines an error error (M(d), M(d')) between the output M(d) of the machine learning model in a case where the data d is input and the output M(d') of the machine learning model in a case where the attack data is input, for each predetermined loss function and for each pair of data and labels (d, s) (S150). Then, the error error(M(d), M(d')) is added to the set of errors E. Specifically, the error error(M(d), M(d')) is added to the set of errors E as follows.

$$E=E\cup error(M(d),M(d'))$$

The error(M(d), M(d')) indicates a function to determine the error between M(d) and M(d'). For example, in a case where M(d) and M(d') are in the real coordinate space, the error acquisition unit 150 determines L2 norm as an error as follows.

$$error(M(d),M(d'))=\|M(d)-M(d')\|_2$$

In a case where M(d) and M(d') are in the discrete space (binary classification or multiclass classification), the error acquisition unit 150 determines the error as follows.

$$error(M(d), M(d')) = \begin{cases} 0 & (M(d) = M(d')) \\ 1 & (M(d) \neq M(d')) \end{cases}$$

The risk evaluation apparatus 100 repeats the loss function regression model acquisition step S105, the attack noise addition step S140, and the error acquisition step S150 for all the predetermined sets (d, s) of data d and labels s (S151). The risk evaluation apparatus 100 repeats the loss function regression model acquisition step S105, the attack noise addition step S140, the error acquisition step S150, and the repeating step S151 for all the predetermined loss functions L recorded in the recording unit 190 (S152). Note that the order of the repeating steps S151 and S152 may be reversed.

The evaluation unit 160 evaluates the risk based on a set of errors determined for each loss function and for each pair of data and labels (S160). Specifically, the evaluation e is determined using the set of errors E as follows.

$$e=RE(E)$$

Where, RE(E) is a function to receive the set E and output the evaluation. For example, in a case where M(d) and M(d') are in the real coordinate space, the evaluation unit 160 determines the maximum value of the errors included in the set E as an evaluation as follows.

$$RE(E)max(E)$$

In a case where M(d) and M(d') are in the discrete spaces (binary classification or multiclass classification), the evaluation unit 160 determines the average of the set E errors as an evaluation as follows.

$$RE(E)=ave(E)$$

The risk evaluation apparatus 100 determines a regression model of a loss function while placing limitation to the vicinity of the data d, and creates an Adversarial Example using the determined regression model. Thus, it is possible to create the Adversarial Example and evaluate a risk without performing a model extraction attack. According to the risk evaluation apparatus 100, it is possible to prepare a predetermined data set D in a situation where the data set utilized for training the machine learning model is unknown, and evaluate the risk. Furthermore, the risk can be evaluated even if the loss function is unknown. Thus, the risk can be evaluated in a realistic situation where the detailed mechanism of the machine learning model is not known.

Program and Recording Medium

Figure 4:
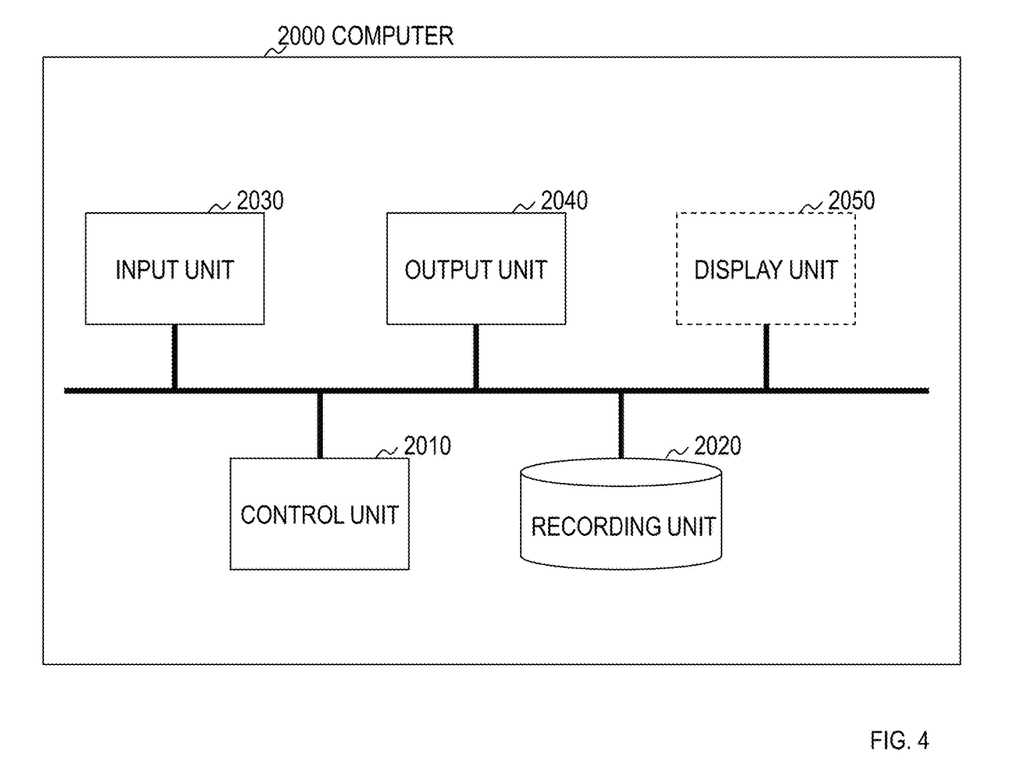
FIG. 4 illustrates a structure of a computer.

The above-described various processes can be implemented by reading programs for executing each step of the above-mentioned method in a recording unit 2020 of a computer 2000 illustrated in FIG. 4, and operating a control unit 2010, an input unit 2030, an output unit 2040, a display unit 2050, and the like.

The program in which the processing details are described can be recorded on a computer-readable recording medium. The computer-readable recording medium, for example, may be any type of medium such as a magnetic recording device, an optical disc, a magneto-optical recording medium, or a semiconductor memory.

In addition, the program is distributed, for example, by selling, transferring, or lending a portable recording medium such as a DVD or a CD-ROM with the program recorded on it. Further, the program may be stored in a storage device of a server computer and transmitted from the server computer to another computer via a network, so that the program is distributed.

For example, a computer executing the program first temporarily stores the program recorded on the portable recording medium or the program transmitted from the server computer in its own storage device. When the computer executes the processing, the computer reads the program stored in the recording medium of the computer and executes a process according to the read program. Further, as another execution mode of this program, the computer may directly read the program from the portable recording medium and execute processing in accordance with the program, or, further, may sequentially execute the processing in accordance with the received program each time the program is transferred from the server computer to the computer. In addition, another configuration may be employed to execute the processing through a so-called application service provider (ASP) service in which processing functions are implemented just by issuing an instruction to execute the program and obtaining results without transmitting the program from the server computer to the computer. Further, the program in this mode is assumed to include information which is provided for processing of a computer and is equivalent to a program (data or the like that has characteristics of regulating processing of the computer rather than being a direct instruction to the computer).

In addition, although the device is configured by executing a predetermined program on a computer in this mode, at least a part of the processing details may be implemented by hardware.

REFERENCE SIGNS LIST

100 Risk evaluation apparatus
105 Loss function regression model acquirer
110 Data changing unit
120 Training data acquisition unit
130 Regression model acquisition unit
140 Attack noise addition unit
150 Error acquisition unit
160 Evaluation unit
190 Recording unit

The invention claimed is:

1. A risk evaluation apparatus for evaluating a risk of a machine learning model, the risk evaluation apparatus comprising:
a recording medium configured to record a set of loss functions that are predetermined and a set of a plurality of pairs of data and labels that are predetermined; and
processing circuitry configured to:
execute a loss function regression model acquirer process which determines, for each of the loss functions and for each of the plurality of pairs of data and labels, a regression model of the loss function in a vicinity of the data by nonparametric regression;
execute an attack noise addition process which creates attack data using the regression model for each of the loss functions and for each of the plurality of pairs of data and labels;
execute an error acquisition process which obtains a set of errors, each of which is an error between an output of the machine learning model in a case where the data recorded in the recording medium is input and an output of the machine learning model in a case where the attack data is input for each of the loss functions and for each of the plurality of pairs of data and labels; and
execute an evaluation process which evaluates a risk based on the set of errors.

2. The risk evaluation apparatus according to claim 1, wherein
the loss function regression model acquirer process:
randomly changes the data in a vicinity of the data in accordance with a predetermined distribution within a space that can be input into the machine learning model, to determine random change data;
determines regression training data, the regression training data being a pair of the random change data and a loss value obtained from the loss function in a case where an output of the machine learning model when the random change data is input and the label are input; and
determines the regression model using a set of the regression training data.

3. The risk evaluation apparatus according to claim 2, wherein
the random change data is obtained by:
adding, to the data, a random number generated in accordance with the predetermined distribution and performing adjustment for obtaining an addition result being within a space that can be input into the machine learning model.

4. The risk evaluation apparatus according to claim 2, wherein
the predetermined distribution is a normal distribution.

5. The risk evaluation apparatus according to claim 1, wherein
the nonparametric regression is a Gaussian process regression.

6. A risk evaluation method for evaluating a risk of a machine learning model, the risk evaluation method comprising:
preparing a set of loss functions that are predetermined and a set of a plurality of pairs of data and labels that are predetermined;
determining, for each of the loss functions and for each of the plurality of pairs of data and labels, a regression model of the loss function in a vicinity of the data by nonparametric regression;
creating, for each of the loss functions and for each of the plurality of pairs of data and labels, attack data being an Adversarial Example using the regression model;
obtaining a set of errors, each of which is an error between an output of the machine learning model in a case where the data prepared is input for each of the loss functions and for each of the plurality of pairs of data and labels; and
evaluating a risk based on the set of errors.

7. The risk evaluation apparatus according to claim 3, wherein
the predetermined distribution is a normal distribution.

8. The risk evaluation apparatus according to claim 2, wherein
the nonparametric regression is a Gaussian process regression.

9. The risk evaluation apparatus according to claim 3, wherein the nonparametric regression is a Gaussian process regression.

10. The risk evaluation apparatus according to claim 4, wherein
the nonparametric regression is a Gaussian process regression.

11. A non-transitory computer-readable recording medium storing executable instructions thereon which, when executed by circuitry, cause the executable instructions to perform a method for evaluating a risk of a machine learning model, the method comprising:
recording a set of loss functions that are predetermined and a set of a plurality of pairs of data and labels that are predetermined;
executing a loss function regression model acquirer process which determines, for each of the loss functions and for each of the plurality of pairs of data and labels, a regression model of the loss function in a vicinity of the data by nonparametric regression;
executing an attack noise addition process which creates attack data using the regression model for each of the loss functions and for each of the plurality of pairs of data and labels;
executing an error acquisition process which obtains a set of errors, each of which is an error between an output of the machine learning model in a case where the data recorded in the recording medium is input and an output of the machine learning model in a case where the attack data is input for each of the loss functions and for each of the plurality of pairs of data and labels; and
executing an evaluation process which evaluates a risk based on the set of errors.

\* \* \* \* \*